# 2,948,036
Patented Aug. 9, 1960

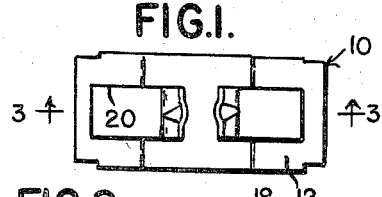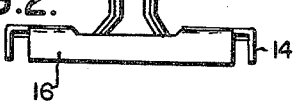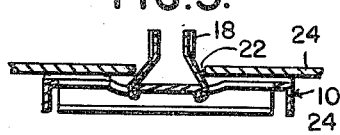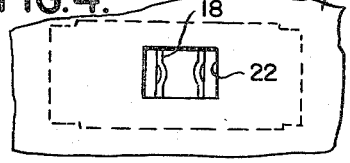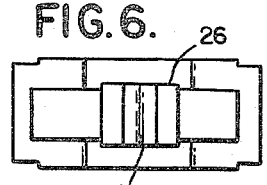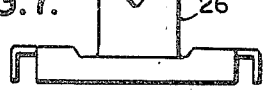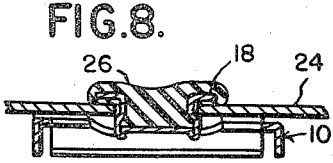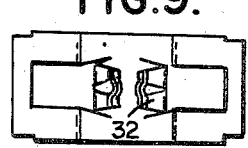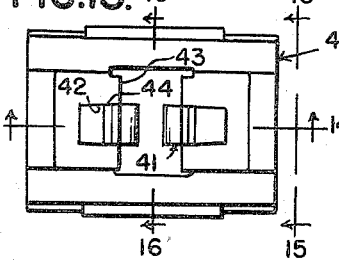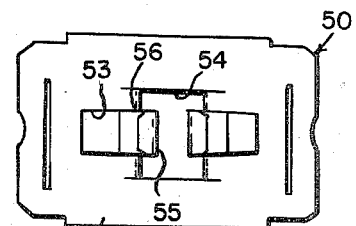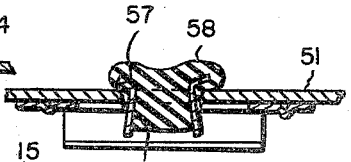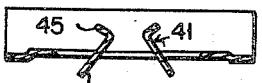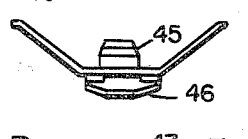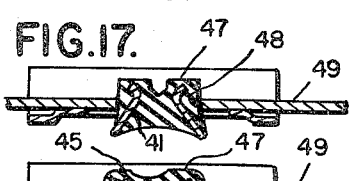

2,948,036
COMPOSITE ARTICLE

Robert M. Heller, Birmingham, Mich., assignor to Watts Electric & Mfg. Co., Birmingham, Mich., a corporation of Michigan Filed Apr. 15, 1957, Ser. No. 652,724

5 Claims. (Cl. 24—73)

The present invention relates to a composite article and more particularly, to one having fastening means, such as a pair of prongs or tangs, projecting therefrom and adapted to be inserted through an opening in a supporting panel to engage side portions of the opening.

It is an object of the present invention to provide a composite article having projecting fastening means adapted to be inserted in an opening in a panel, the fastening means being surrounded by a yieldable sealing material adapted together with the fastening means to completely fill and seal the opening in the panel.

More specifically, it is an object of the present invention to provide a device having a pair of projecting prongs or tangs adapted to be inserted through an opening in a panel part to cooperate with the sides thereof to retain the article or device in supported position, in which the prongs or tangs are surrounded by and completely embedded in a yieldable sealing material adapted with the tangs to completely fill and seal the opening in the panel.

More specifically, it is an object of the present invention to provide a composite article or device comprising a sheet metal member having a pair of prongs or tangs struck out therefrom and adapted to be inserted in an opening in a panel, said prongs or tangs being embedded in a unitary body of a yieldable sealing material dimensioned to completely fill and seal the opening in the panel.

It is a further object of the present invention to provide a composite article or device consisting of a sheet metal body having a pair of prongs or tangs struck out therefrom and shaped to extend laterally from the body, the tangs or prongs leaving an opening through the body, sealing material completely surrounding the prongs or tangs and filling the space therebetween, the sealing material being dimensioned to completely fill and seal the opening in the panel.

Other objects and features of the invention will become apparent as the description proceeds, especially when taken in conjunction with the accompanying drawing, illustrating preferred embodiments of the invention, wherein:

Figure 1 is a plan view of a metal device intended to be supported on a panel.

Figure 2 is a side view of the element shown in Figure 1.

Figure 3 is a sectional view taken substantially on the line 3—3, Figure 1, showing the device located with the tangs extending through an opening in a panel.

Figure 4 is an elevational view of the panel showing the tangs extending through the opening.

Figure 5 is a view similar to Figure 3 showing the tangs bent to support the device on the panel.

Figure 6 is a view similar to Figure 1, of the composite article in which the tangs are embedded in yieldable sealing material.

Figure 7 is a side elevational view of the composite article shown in Figure 6.

Figure 8 is a sectional view through the composite article showing it mounted on a supporting panel.

Figure 9 is a plan view of a somewhat different article having supporting tangs for insertion into an opening in a panel.

Figure 10 is a side elevational view of the article shown in Figure 9.

Figure 11 is a view similar to Figure 10 showing the tangs embedded in a body of yieldable sealing material.

Figure 12 is a longitudinal section view through the article or device, showing the tangs and surrounding sealing material inserted in an opening in a panel.

Figure 13 is a plan view of a somewhat different article or device.

Figure 14 is a sectional view on the line 14—14, Figure 13.

Figure 15 is an end view looking in the direction of the arrows 15—15, Figure 13.

Figure 16 is a sectional view on the line 16—16, Figure 13.

Figure 17 is a view similar to Figure 14 showing the fastening elements embedded in a body of yieldable sealing material and with portions of the fastening elements and sealing material inserted in an opening in a panel.

Figure 18 is a sectional view similar to Figure 17 showing the fastening elements displaced to supporting position.

Figure 19 is a plan view of yet another embodiment of the invention.

Figure 20 is a sectional view through the device of Figure 19 showing its fastening elements inserted in a panel.

Figure 21 is a view similar to Figure 20 showing the fastening elements engaged in the opening.

Referring first to the embodiment of the invention illustrated in Figures 1–8, the invention is illustrated as related to a metal fastener which may be used to fasten moldings and trim items to body panels or sheet metal panels in general. The articles or devices may be used in refrigerators, stoves, radios, TV's, autos, trucks, etc.

The invention relates specifically to the attachment of the articles to panels by insertion of fastening elements in openings in the panels, and the improvement of the present invention comprises the addition of sealing means to surround and completely embed the fastening elements and being constructed and arranged to constitute a complete effective seal in the opening in the panel.

The article 10 illustrated in Figures 1–8 is formed of sheet metal and comprises a generally flat body portion 12 having end flanges 14 and side flanges 16. The material of the flat body portion is cut as indicated to provide the fastening elements, prongs or tangs 18, these elements leaving the openings 20 in the bodies 10. In use the fastening elements 18 are inserted through an opening 22 formed in a panel part 24 as well illustrated in Figures 3 and 4. As seen in Figure 4, the opening 22 in the panel 24 is of rectangular shape. In order to retain the device 10 in mounted position the tangs 18 are bent over as indicated in Figure 5. The amount of bending may be as indicated in this figure or it may be substantially less, and only sufficient to insure gripping of edge portions of the opening 20 by the tangs.

In accordance with the present invention the tangs 18 are completely embedded in a solid block 26 of a yieldable sealing material. The solid block of sealing material completely embeds and surrounds the tangs 18 and fills the spaces therebetween. Excellent results are obtained when the sealing material is a thermoplastic material such as a vinyl plastic, or other yieldable resilient sealing materials such as synthetic or foam rubber are effective for the purpose. The yieldable resilient plastic material is applied by an operation which includes molding the block of sealing material to a desired shape. The plastic material may have any desired color imparted to it if it is to be exposed in use.

The sealing material, as a result of having been molded to an exactly required shape, provides a uniform sealing action to produce identical seals in the openings in the supporting panel parts without variation.

As best seen in Figure 7, the block 26 of plastic material is provided with a recess 28 which extends inwardly generally between the fastening elements 18 in order to serve as an indication as to which way the fastening elements should be spread and also to facilitate the spreading operation.

In Figure 8 the fastening elements 18 are indicated as having been spread apart into interlocking relation with edge portions of the panel 24. This movement of the fastening element is of course permitted due to the yielding nature of the plastic material and is accomplished without breaking the seal provided by insertion of the block of plastic material into the opening 22 of the panel.

The particular article or device illustrated in Figures 1–8 has been described in considerable detail in order to provide a full and complete understanding of the present invention. The articles or devices illustrated in the remaining figures are described in complete detail only as to features which differ from those of the article or device illustrated in Figures 1–8.

Referring now to Figures 9–12 a device 30 is illustrated in which the attaching prongs or tangs 32 extend laterally from the body of the article 30 and are shaped to have converging portions adjacent the body of the article 30 and slightly diverging portions at the free ends thereof. The prongs or tangs 32 are somewhat resilient and the mounting of the article 30 on the associated panel 34 is accomplished by pressing the prongs through an opening 36 which forces the prongs together. The resilience of the prongs causes them to expand or separate when the constricted portion thereof occupies the plane of the panel 34. In this embodiment of the invention the prongs 32 are completely embedded in a block 38 of a yieldable resilient plastic sealing material. Again, the block 38 is molded to a shape such as to interfit in sealing relation with the opening 36 in the panel 34.

Referring now to Figures 13–18 there is illustrated an article or device 40 having fastening elements, tangs or prongs 41 cut out of the body of the member 40 in such a way as to leave openings 42 and 43. As best seen in Figure 14, the fastening elements 41 are in effect supported for movement by a bending operation which involves bending at the portions indicated generally at 44. The fastening elements 41 include laterally extending projections 45 normally engageable behind edge portions of a panel surrounding an opening therein, the fastening elements also including actuating arm portions 46. When the arms 46 are pressed together, the projecting portions 45 are moved apart into latching relation.

In accordance with the present invention the fastening elements 41 are completely embedded in a block 47 of a yieldable resilient plastic sealing material. In the particular embodiment of the invention illustrated the block 47 is indicated as of generally cylindrical form, this being indicated by the shade lines of Figure 16. The block of sealing material 47 is thus adapted for insertion into a circular opening 48 in the mounting strip 49.

In Figure 17 the projecting portions 45 of the prongs or tangs 41, together with the surrounding portion of the block 47 of sealing material is illustrated as inserted through the opening 48. Thereafter, the actuating arm portions 46 are pressed together, bending the fastening elements 41 to the position illustrated in Figure 18, in which the projecting portions 45 interact with edge portions of the opening in the mounting strip 49.

Referring now to Figures 19–21 there is illustrated the article or device 50 designed to be mounted on a panel 51. The device 50 has a body portion 52 cut out to provide openings 53 and 54 to leave the fastening elements 55 which prior to assembly are bent to occupy the position illustrated in Figure 19. The fastening elements 55 are in effect mounted for pivotal movement by attaching portions 56. The fastening elements include laterally projecting portions 57 and these, together with adjacent portions of the fastening elements 55 are embedded in a unitary block 58 of a yieldable resilient plastic sealing material which not only surrounds the attaching portions of the fastening elements 55 but serves to completely fill the space therebetween.

To mount the device 50 on the panel 51 the block 58 of the plastic material, with the embedded portions of the fastening elements therein, is inserted through the correspondingly shaped opening 59 of the panel to the position illustrated in Figure 19. Thereafter, the portions of the fastening elements remote from the projecting portions 57 thereof are pressed together as indicated in Figure 21, thereby causing the fastening elements to swing about the portions which attach them to the body portion 52 of the article or device 50 and to cause the projecting portions 57 thereof to interact at the rear of the panel 51 as illustrated in Figure 21. This action is permitted by the yieldability of the sealing body 58 which thus maintains the sealing action by completely filling the opening 59 in the panel 51.

The drawing and the foregoing specification constitute a description of the improved composite article in such full, clear, concise and exact terms as to enable any person skilled in the art to practice the invention, the scope of which is indicated by the appended claims.

What I claim as my invention is:

1. A fastening device comprising a sheet metal clip provided with a pair of fastening tang portions extending transversely therefrom, said tang portions being movable away from each other after insertion in an opening in a support body to secure the device therein, the aforesaid transversely extending tang portions being completely embedded within a block of yieldable sealing material, said block having a groove extending transversely across its end between said tang portions to facilitate movement of said tangs away from each other.

2. A fastening device comprising a sheet metal clip provided with a pair of bendable fastening tang portions extending transversely therefrom, said tang portions being movable away from each other after insertion in an opening in a support body to secure the device therein, the aforesaid transversely extending tang portions being completely embedded within a block of yieldable vinyl plastic, said block having a groove extending transversely across its end between said tang portions to facilitate movement of said tangs away from each other and to indicate the direction in which said tang portions should be bent.

3. A fastening device comprising a sheet metal clip provided with a pair of fastening tang portions extending transversely therefrom, said tang portions being movable away from each other after insertion in an opening in a support body to secure the device therein, the aforesaid transversely extending tang portions being completely embedded within a block of yieldable sealing material, said block having a groove extending transversely across its end between said tang portions to facilitate movement of said tangs away from each other, said clip having a generally flat body from which said tang portions extend.

4. A fastening device comprising a sheet metal clip provided with a pair of fastening tang portions extending transversely therefrom, said tang portions being movable away from each other after insertion in an opening in a support body to secure the device therein, the aforesaid transversely extending tang portions being completely embedded within a block of yieldable sealing material, said block having a groove extending transversely across its end between said tang portions to facilitate movement of said tangs away from each other, said clip having an elongated generally flat body from which said tang portions extend, the edge portions of said body being bent at an angle to form reinforcing flanges.

5. A fastening device comprising a sheet metal clip provided with a pair of fastening tang portions extending transversely therefrom, said tang portions being movable away from each other after insertion in an opening in a support body to secure the device therein, the aforesaid transversely extending tang portions being completely embedded within a block of yieldable sealing material, said block having a groove extending transversely across its end between said tang portions to facilitate movement of said tangs away from each other, said clip having an elongated generally flat body from which said tang portions extend, the edge and end portions of said body being bent at an angle to form reinforcing flanges.

References Cited in the file of this patent

UNITED STATES PATENTS

| | | |
|---|---|---|
| 2,139,244 | Nauert | Dec. 6, 1938 |
| 2,271,495 | Hall | Jan. 27, 1942 |
| 2,643,433 | Scott | June 30, 1953 |
| 2,875,487 | Holton | Mar. 3, 1959 |
| 2,900,687 | Cochran | Aug. 25, 1959 |

FOREIGN PATENTS

| | | |
|---|---|---|
| 681,678 | Great Britain | Oct. 29, 1952 |